United States Patent
King et al.

[11] Patent Number: 5,622,100
[45] Date of Patent: Apr. 22, 1997

[54] CATALYTIC ASSEMBLY FOR COOKING SMOKE ABATEMENT

[75] Inventors: Donald E. King, Louisville, Ky.; Walter Juda, Lexington; Amiram Bar-Ilan, Brookline, both of Mass.

[73] Assignee: Ayrking Corporation, Louisville, Ky.

[21] Appl. No.: 677,249

[22] Filed: Jul. 9, 1996

Related U.S. Application Data

[63] Continuation of Ser. No. 590,868, Jan. 24, 1996, abandoned, which is a continuation of Ser. No. 453,992, May 30, 1995, abandoned, which is a continuation of Ser. No. 314,541, Sep. 28, 1994, abandoned, which is a continuation of Ser. No. 173,911, Dec. 23, 1993, abandoned, which is a continuation of Ser. No. 923,144, Jul. 31, 1992, abandoned.

[51] Int. Cl.$^6$ .............................. A47J 37/00; F24C 15/20
[52] U.S. Cl. .................. 99/386; 99/423; 99/477; 126/299 F; 126/21 A; 422/168; 422/177
[58] Field of Search .................. 99/385, 386, 388, 99/404, 423, 443 C, 476, 477; 126/21 A, 299 F, 907; 219/388, 391; 422/168, 177

[56] References Cited

U.S. PATENT DOCUMENTS

| | | | |
|---|---|---|---|
| 2,279,791 | 4/1942 | Lamb | 126/299 F |
| 2,286,479 | 6/1942 | Farr | 126/299 F |
| 2,812,038 | 11/1957 | Krueger | 126/299 F |
| 3,428,435 | 2/1969 | Hurko et al. | 23/288 |
| 3,536,457 | 10/1970 | Henderson | 23/288 |
| 3,646,878 | 3/1972 | Keller | 99/339 |
| 3,823,660 | 7/1974 | Nerthling | 99/386 |
| 3,962,561 | 6/1976 | Maitenaz | 219/391 |
| 4,089,260 | 5/1978 | Brown et al. | 99/388 |
| 4,113,439 | 9/1978 | Ookubo et al. | 422/177 |
| 4,350,504 | 9/1982 | Diachuk | 126/299 F |
| 4,400,356 | 8/1983 | McVay et al. | 126/299 F |
| 4,516,486 | 5/1985 | Burkhart | 99/388 |
| 5,125,328 | 6/1992 | Grandi | 99/404 |
| 5,431,887 | 7/1995 | Bar-Ilan . | |

Primary Examiner—David Scherbel
Assistant Examiner—James F. Hook
Attorney, Agent, or Firm—Woodard, Emhardt, Naughton, Moriarty & McNett

[57] ABSTRACT

A smoke abatement assembly is provided as an adjunct overlaying a cooking device such as a broiler or fryer system in a commercial restaurant. The smoke abatement assembly comprises a sealed housing which supports a low-pressure flame arrester, between 1 and 10 inches above the cooking area of the cooking device. A catalyst module is also removably mounted within the sealed housing above the flame arrester. The module includes a plurality of spaced low-pressure oxidation catalysts of controlled thickness, between 1 and 6 inches thick. The plurality of catalysts have a combined thickness equal to the thickness of a single catalyst providing the optimum catalyst volume or contact time for the installation. Each of the components, that is the flame arrester and plurality of catalysts, defines a smoke access area substantially equal to the cooking area of the broiler or fryer. A preheater can be provided to maintain the temperature at the catalysts at an optimum range during idle conditions when no cooking is occurring.

13 Claims, 2 Drawing Sheets

5,622,100

CATALYTIC ASSEMBLY FOR COOKING SMOKE ABATEMENT

This application is a continuation of application Ser. No. 08/590,868, filed on Jan. 24, 1996, now abandoned, which is a continuation of application Ser. No. 08/453,992, filed on May 30, 1995, now abandoned, which is a continuation of application Ser. No. 08/314,541, filed on Sep. 28, 1994, now abandoned, which is a continuation of application Ser. No. 08/173,911, filed on Dec. 23, 1993, now abandoned, which is a continuation of application Ser. No. 07/923,144, filed on Jul. 31, 1992, now abandoned.

BACKGROUND OF THE INVENTION

This invention relates to a catalytic assembly for abating the smoke generated from the burning of organic materials including fats, proteins, and/or carbohydrates, during food preparation. This invention has particular application for use with broilers and fryers such as are commonly used in fast food restaurants.

In typical broilers and fryers, as used in fast food restaurants, emissions from broiling fatty hamburger, for example, contain carbon monoxide, organic vapors and aerosols which constitute an environmental, health and fire hazard. In present practice, these threats are masked by diluting the smoke with large amounts of air blown into and through kitchens and exhausted through hoods and chimneys to the outside environment. This practice entails costly air conditioning, i.e. heating or cooling. This standard approach does not prevent condensation and buildup of aerosols in hoods and chimneys, and instead merely shifts the same amount of air pollutants (including objectionable odors) from the indoors to the outdoors.

Due to stricter governmental regulations, as well as economic considerations, it is rapidly becoming important to substantially eliminate the smoke generated by cooking apparatus, preferably by oxidizing the contaminants to carbon dioxide and water. Other much less desirable methods include filtration and electrostatic precipitation of only non-gaseous smoke contaminants (leaving carbon monoxide in the exhaust), or thermal incineration at or above 800° C. While incineration oxidizes all organics, this technique entails costly high temperature resistant equipment and additional high fuel expense. Moreover, incinerators can produce noxious $NO_x$ which in turn can only be partially mitigated by yet another investment in heat exchangers and $NO_x$ reduction catalysts.

Oxidation catalyst for cooking emissions are well known in the art. By way of example, U.S. Pat. No. 3,962,561 describes a closed "pyrolytic" self-cleaning oven which is provided with catalytic enamel walls and a "small" oxidation catalyst. The term "small" as used herein in this connection, means a catalyst having a smoke access area several times smaller than the cooking area. Similar units are also described in U.S. Pat. Nos. 3,428,435 and 3,536,457.

Burkhart (U.S. Pat. No. 4,516,486) describes a similar cooking apparatus with a chimney mounted on an enclosure of the cooking area. The chimney supports a small catalyst such as a honeycomb ceramic catalyst, as well as a small electrical (Nichrome) heater. When the catalyst is heated to 600° F. the cooking vapors are burned to yield water vapor and carbon dioxide.

Ookubo et al. (U.S. Pat. No. 4,113,439) also describe a closed cooking apparatus with a small diameter exhaust pipe containing a layered assembly of small catalysts utilizing platinum or $MnO_2$-based oxidation catalysts, and at least one oil fume decomposing layer. The oil fume decomposing layer is designed to equalize the amount of oil fumes, and also to play the role of dispersant to make the contact of the oil fumes with the catalyzer as uniform as possible.

A common feature in the art has been the funneling of the smoke from a large fully enclosed cooking area to a small catalyst. The need has arisen for a smoke abatement assembly that is better able to accommodate the sporadic non-uniform smoke release, including practically uncontrollable bursts due to irregular grease flaming that is typical in fast food broiling and frying operations. As recognized by Ookubo et al., many catalysts require a uniform flow of volatile (preferably aerosol-free) contaminants, for substantially complete oxidation thereof. Typically this has required an expensive system involving an enclosed complex cooking apparatus provided witch fans and/or heat distributors, or even extra heaters as above described. Moreover, regardless of cost, such prior systems have not been configured or convenient to retrofit open-top broilers or fryers such as are commonly used under hoods in restaurants. Prior devices have had a tendency to induce changes in heat distribution in the cooking area which adversely affects the quality of the food and the productivity of the cooking process.

Moreover, prior catalyst units have been inadequate for use in conjunction with conveyor broilers typically found in fast-food restaurants. In conveyor broilers successive servings of meat are charbroiled or fried in a continual production line. Conveyor apparatus of this type present a rather demanding environmental emission regulation requirement underlying the required purging and exhausting of the cooking effluent while also preventing the rapid poisoning of the catalytic converters by components of the cooking smoke. There is therefor a need for a catalyst unit that can also be readily adapted for use with conveyor broilers of the fast-food industry.

SUMMARY OF THE INVENTION

A typical broiler or fryer system as referred to in connection with the invention comprises a housing which supports heaters spaced to broil or fry foods on one or all sides, usually with concomitant flaming in broilers. The housing has an open top with an area of controlled size substantially overlaying the heat sources. In a typical fast food arrangement, a conveyor belt extends across the housing adjacent the heaters having inlets and outlets outside of the housing. Raw food is introduced at the inlet and removed at the outlet after having been cooked within the housing.

In one of its broad aspects the invention embraces, as an adjunct overlaying a broiler or fryer system, a smoke abatement assembly comprising, upward in succession, a spaced low-pressure flame arrester and at least one, and preferably more than one, spaced low pressure oxidation catalyst of controlled thickness. Each component has a smoke access or flow area substantially equal to (that is, between about three quarters an one-and-one half times the size of) the cooking area of the broiler or fryer. A canopy can be provided to funnel substantially all of the smoke generated during broiling through the arrester and the catalyst(s). The canopy would be situated over the inlet and outlet to the cooking device.

To insure uniformity of smoke flow and catalyst temperature for efficient oxidation, the arrester and catalyst supports are, preferably, metallic and have controlled spacings and porosity to allow ready flow equalization and low resistance to flow. To prevent leakage of smoke around the assembly, the housing canopy can be configured to extend over hot discharge and inlet areas of the broiler system.

It is an object of this invention to provide an open top cooker with a smoke abatement assembly capable of substantially complete oxidation of smoke contaminants. It is a further object to provide such an assembly for retrofitting an open top broiler or fryer substantially without interference with its normal operation. A concomitant object is achieved by a system adapted for use with a conveyor broiler such as frequently used in the fast-food industry.

It is yet another object to provide such an assembly with a metal-based catalyst of sufficient flow area and volume to be heated solely by the cooking and/or the heat generated in the oxidation. Finally, it is an object of this invention to provide properly spaced low pressure drop components of such an assembly to allow slow flow of smoke therethrough under minimal action, that is without the need for an additional blower to overcome the flow resistance (i.e. pressure drop) caused by the assembly's components. Related objects and advantages of the present invention will be apparent from the following description.

DESCRIPTION OF THE PREFERRED EMBODIMENT

Figure 1:
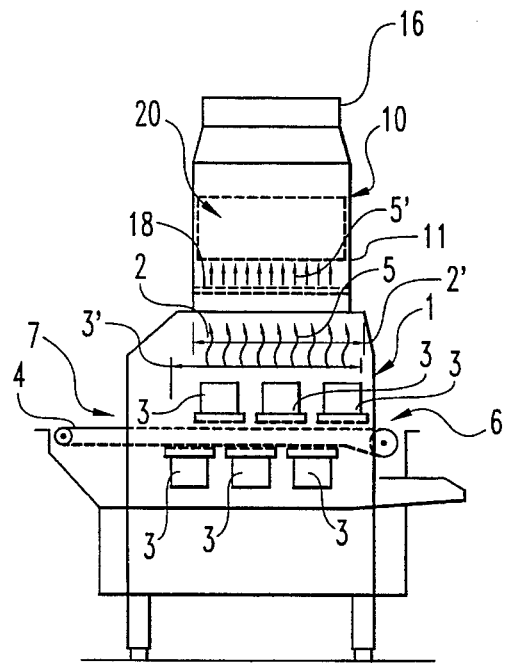
FIG. 1 is a side view of a typical conveyor broiler with the smoke abatement assembly of one embodiment of the invention mounted thereon.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is a schematic representation of a cooking system (e.g. broiler or fryer) overlaid by the smoke abatement assembly of the present invention. The cooking system comprises a housing 1 with an open top 2, having an area 2' that is substantially equal to the cooking area 3' defined by the heaters 3. Typically a moving belt 4 provides a means of conveying the food through the cooking area. The cooking operation generates rising smoke 5 which is typically non-uniform due to, e.g., grease flaming in broiling. External to the enclosure 1 are inlet 6 and outlet 7 for introducing and removing the food from the cooking system.

The smoke abatement assembly 10 of the invention which is shown positioned above the cooking system generally comprises duct means 11 having a cross-sectional flow area substantially equal to the cooking area. A low pressure flame arrester 18 is positioned above the cooking area for the dual purpose of mixing the smoke and arresting flames when present. A catalyst module 20 includes at least one low pressure drop catalyst positioned above the flame arrester. While non-uniform smoke 5 reaches the flame arrester 18, substantially uniform smoke 51 rises from the arrester to the catalyst. The arrester 18 and catalyst module 20 are mounted and tightly fitted into the duct to prevent smoke by-pass. Completing the assembly, an outlet duct 16 can extend from the top of the duct means 11 to provide means for mating with a chimney flue to the outside. The outlet duct 16 can be a hood configured to increase the draw through the duct means due to a "chimney effect".

Important features of the invention are the configuration and size of the catalyst module 20. The performance of the catalysts within the module, in terms of the rate of oxidation of the contaminants at a given temperature and for a given catalytic volume and internal surface area, depends on the space velocity. Space velocity is defined as the volume of gaseous fluid flowing through the catalyst per hour divided by the catalyst volume. Space velocity is the reciprocal of the contact time, which is the amount of time that the smoke is in contact with the catalytic material. A contact time of about ½ second is preferred in many applications.

The same catalyst volume can be embodied either in a "tall" and small-diameter (i.e. small cross section) cylinder, or a "short" and large diameter (i.e. large cross section) cylinder. All other things being equal, the pressure drop across a tall catalyst is much larger than the drop across a small one. A greater pressure drop can lead to backflow or buildup of smoke in the cooking area, unless a blower is added to force the gaseous mixture through the catalysts. On the other hand, uniform flow is more readily attainable through a tall catalyst, whereas a small catalyst is subject to "channeling" and non-uniform flow, especially at low flow rates. Uniform flow ensures complete treatment of the smoke within the smoke abatement assembly 10.

In most commercial cooking operations, fans and heaters are required to provide uniform smoke flow through a "small" catalyst. As briefly aforementioned, it is counterproductive to retrofit existing cookers, especially broilers and fryers, with such fans and heaters.

In practice, it is crucial to avoid localized smoke, because the quality of the cooked food is adversely affected by changes in the heating pattern of the food. Small catalysts are prone to cause localized smoke and therefore heating. For example, local over-cooking inevitably results because the small catalyst itself must be maintained at inlet operating temperatures of 1400°–1660° F. either by oxidation of organics in the smoke and/or by an additional heater. Heat radiated downward from the small catalyst area creates local hot spots in the cooker and cooking area.

The present invention provides an unexpected solution to the dilemma of achieving slow and uniform smoke flow through short catalysts with large cross sections without the need for supplementary heat or fans. By substantially equalizing the cooking area and the catalyst flow area hot spots are eliminated. Moreover, heat radiated uniformly from the bottom of the catalysts toward the cooking area provides a benefit in at least maintaining and often even improving the food quality, as well as in savings of fuel to heat the cooking heater or broiler.

In conjunction with the "large cross-sectional flow area" catalysts and arresters producing substantially complete abatement of the emissions, an appropriate outlet duct 16 or chimney allows air to be drawn from the outside uniformly to the broiler. The smoke then passes through appropriately spaced low pressure drop flame arrester(s) and smoke abating catalyst(s) to the outdoors to attain substantially complete smoke abatement without additional fans and/or heaters. The invention can achieve a critical range of linear flow velocities (defined as the volumetric air flow rate at the operating temperature divided by the catalyst's cross sectional area), which is related to the configuration and spacing of the catalysts. It has been found that this critical range of flow velocities is 30 to 80 ft/sec., at which flow rates substantially complete abatement of emissions is achieved.

As an example, turning to the very severe case of the smoke generated in meat broiling with its concomitant grease flames, a flame arrester is positioned preferably between about 1" and 10" above the broiler. The flame arrester prevents the sporadic grease flames in broiling from touching the catalyst above it. Of equal importance, the arrester smooths out non-uniformly generated smoke to prevent irregular catalyst heating caused by the broiler's flames, which heat is superimposed on heat radiated flora the broiler's heater. To avoid impeding the smoke flow unduly while fulfilling these functions, a preferred flame arrester is about 35 mils which with open pores equivalent to a mesh size or 8, such as an expanded metal #304 stainless steel screen. For best results two such arresters can be spaced between about ½" and 4" apart to prevent any contact between grease flames and the catalyst.

The emissions in cooking operations, especially in meat broiling and frying often contain inorganic contaminants in addition to a complex mixture of gaseous and aerosol organics. Finely divided solid inorganics, such as salts and oxides of phosphorous resulting from the decomposition of phospholipids, are entrained in the smoke. These solid inorganics pass through the relatively open-pore flame arrester and are at least partially deposited on the catalyst. Generally, salts mask the catalyst and the phosphoryl compounds poison the catalyst both causing loss of performance and reduction in the usable life of the catalyst.

To mitigate this effect, i.e. to extend the life of the catalyst, the flame arrestor 18 of the preferred embodiment comprises a stainless steel screen coated with a strongly adherent catalytic inorganic adsorbent/filtering medium capable of retaining the solid inorganics as well as partially pre-oxidizing (cracking) aerosol organics in the smoke. This type of coated flame arrester and its use in cooking operations is more fully disclosed in a copending patent application Ser. No. 07/885,185 by inventor Amiram Bar-Ilan, filed on May 19, 1992, now U.S. Pat. No. 5,431,887. In general, this co-pending application described a coating comprising a high surface area inorganic oxide catalyzed adsorbent, such as alumina or zeolite, which is adhered to the screen by an inorganic binder, such as ceria, in which the coating is preferably applied on the order of 0.10 grams per square inch.

Examples of suitable catalysts for the purpose of this invention are formed by a low pressure drop metallic, such as stainless steel, honeycomb substrate with no less than 25 and no more than 300 cells per inch (cpi), and preferably with 50 and/or 70 cpi. The honeycomb walls are preferably about 5 mil thick. The cells bear an oxidation catalytic coating of a nobel metal, such as platinum, which may be as described in U.S. Pat. No. 4,900,712, which description is incorporated herein by reference.

The cross-sectional flow are of the catalyst module 20 is substantially equal to the cooking area of the broiler or fryer. As aforementioned, one significant benefit of providing such equal catalyst flow area is to insure substantially uniform beneficial back-radiation of heat from the hot catalyst to the whole of the cooking area rather than detrimental non-uniform radiation to a small section thereof. The term "substantially equal catalyst area" as used accordance with the invention means a catalyst flow area which is at least equal to about three-quarters (¾) of the cooking area and no larger than about one-and-one half (1½) times thereof. The above described uniformity is attained with catalyst flow areas within this range while also allowing smoke funneling through the low-pressure drop components of the assembly without the need of additional blowers. To accommodate the above critical range of linear flow velocities, the range of thicknesses of such catalysts is between 1" and 6". In addition, the catalyst module 20 is positioned between one-half (½) and two (2) inches above the flame arrester 18.

In further accordance with the invention, unexpected improvements in catalytic performance are obtained by a catalyst module 20 that includes several separate spaced catalysts, preferably 2 or 3, having the same combined volume as a single catalyst which would otherwise be two or three times thicker. It has been found that the spaced catalysts can lead to an increase in linear velocities of about 15 to 35 percent over a single thickness catalyst of equal volume. One possible mechanism for these improvements is an improvement in gas-phase mixing of the smoke between the two or three catalysts. It can also be postulated that the spaced catalysts reduce turbulence in the gaseous mixture as it flows through the catalyst module 20.

Figure 2:
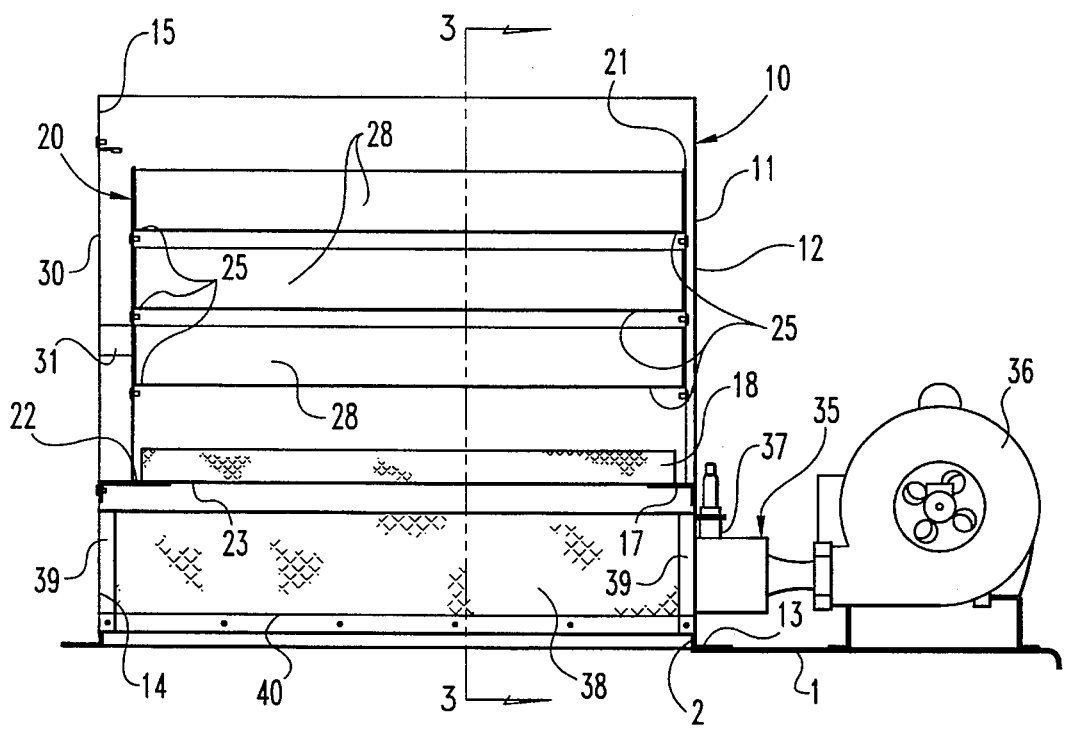
FIG. 2 is a side cutaway partial cross-section view of the smoke abatement assembly depicted in FIG. 1.
Figure 3:
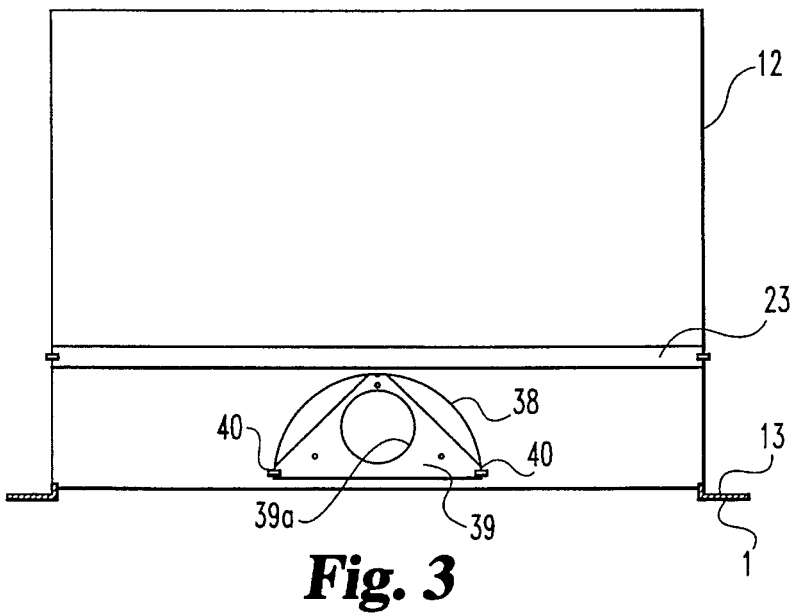
FIG. 3 is a cross-sectional view of the smoke abatement assembly in FIG. 2, taken along line 3—3 in that figure, as viewed with the catalytic components and flame arrestor removed.

A preferred embodiment of the smoke abatement assembly 10 is shown in FIGS. 2 and 3. As shown in FIG. 2, the smoke abatement assembly 10 includes a duct means 11 which comprises a generally rectangularly shaped housing 12. The housing 12 has a perimetrical mounting flange 13 which fits over the outlet opening 2 of the housing 1 of the cooking device. The duct means 11 has an inlet opening 14 which is concentrically located over the opening 2 directly above the cooking components 3 (FIG. 1). The outlet opening 15 has substantially the same area as the inlet opening 14. The outlet opening 15 is adapted to engage the outlet duct 16 which provides a path for the scrubbed smoke to an exhaust chimney.

The catalyst module 20 includes a housing 21 which is adapted to be disposed within the housing 12 of duct means 11. The housing 21 is formed into a lower perimetrical flange 22 which is configured to sit upon an interior flange 17 of the duct means housing 12. The lower flange 22 of the catalyst module housing 21 forms an inlet opening 23. In the preferred embodiment the flame arrester 18 is mounted over this inlet opening 23 on the lower flange 22 of the catalyst module. At the interior of the housing 21 are a number of support flanges 25 on opposite walls of the housing. The support flanges are adapted to support individual catalysts 28.

The housing 12 of duct means 11 includes an access panel 30 which is removably mounted to the remainder of the housing 12. Removal of the access panel allows removal of the catalyst module 20 by way of the handle 31. Thus, the catalyst module can be readily removed for servicing. In addition a new catalyst module can he installed having a different configuration of catalysts 28 as required for a particular application of the smoke abatement assembly 10. In one specific embodiment, the effective cooking area 3', and consequently the flow area of the catalytic assembly 10, is about 24⅓"×18¼".

In some applications, it is necessary to preheat the smoke rising from the broiler or cooking surface. Preheating the smoke allows a more efficient conversion in the catalyst 28. In the preferred embodiment, optimum performance of the catalysts is at a minimum temperature of about 900° F., which is the temperature at which the hydrocarbons in the smoke oxidize or burn. In an "idle" condition or when no cooking is occurring, the catalysts temperature can drop below this minimum temperature. when cooking is commenced, the rising smoke can raise the catalyst temperature by 200°–300°. However, a certain amount of time is required for the catalysts to reach operating temperature, during which time smoke is passing relatively unaffected through the catalyst module 20.

Consequently, a preheater assembly 35 can he provided. The preheater assembly 35 includes a blower 36 which can be mounted on the housing 1 of the broiler or cooking device. The blower 36 provides air to a burner 37 which can include a spark igniter. The preheated air flows through a mesh screen channel 38 and eventually rises upward through the mesh up to the catalyst module 20. The mesh screen 38 is supported at the interior of the duct means 11 by way of a pair of opposite mounting brackets 39 bounded by a pair of cross beams 40. The mesh screen channel 38 is shown in more detail in the cross-sectional view of FIG. 3. In this view, it can be seen that the mounting bracket 39 includes an opening 39a which communicates with the burner 37 and blower 36. The cross-beams 40 are shown bolted to the brackets 39. The mesh screen channel 38 comprises a large mesh screen which is bent in a semi-circular shape around the mounting bracket 39 and cross-beam 40. The area of the mesh screen channel 38 is preferably about a third of the total area of the inlet opening 14 of the duct means 11, so that smoke rising from the cooking surface is not seriously impeded.

Preferably, the preheater assembly 35, and specifically the burner 37, is thermostatically controlled. A number of thermocouples can be mounted at various locations along the catalyst module 20 to gauge the temperature at the several catalysts 28. When the temperature of these catalysts has reached an optimum operating temperature or when the catalyst temperature exceeds a maximum temperature, such as 1200° F., the burner 37 can be turned off. The blower 36 may also be shut off or may remain operating to enhance the flow of smoke through the smoke abatement assembly 10 and to increase the oxygen supply for the oxidation or burning of the smoke pollutants. In specific embodiments, the burner 37 can be an electric burner or a natural gas burner. The preheater assembly 35 is preferably sized to maintain the catalysts 28 at a temperature of 900°–950° F. during the idle mode when no cooking is being performed. As the cooking unit is used, however, the temperature from the cooking area increases and the need for the preheater assembly 35 is eliminated.

In one specific embodiment of the invention, as depicted in FIG. 2, a stainless mesh flame arrester is situated approximately 7 inches above the top of the broiling surface of the cooking apparatus 1. The flame arrester screen is preferably wash coated with a flame arresting material. In the specific embodiment, the flame arrester screen 18 has a mesh size of 90 openings per square inch. In this specific embodiment, the lowermost catalyst is oriented two inches above the flame arrester 18. The two lowermost catalysts can be two-inch deep honeycomb catalyst beds of 70 cpi cell density. The upper catalysts is, in this specific embodiment, a one inch deep honeycomb bed with a 50 cpi cell density. The catalysts are separated by a one-half inch gap.

A number of tests were conducted using smoke abatement assemblies embodying the principles of the present invention. Most of these tests are disclosed herein. Each of the tests was conducted at a commercial fast-food restaurant. The restaurant employed a conveyor broiler assembly used to cook large hamburgers. The purpose of the test was to determine the amount of smoke and gaseous pollutants that were dispersed into the restaurant cooking area and discharged outdoors, and that were processed through the smoke abatement assembly.

Control Configuration

Six large hamburgers were broiled without the use of the catalyst module 20, but with duct means 11, including a housing 12 that was 12 inches high. The room became filled with very heavy smoke having a strong and distinct odor. Sample tests on top of the broiler showed 775 ppm of carbon monoxide (CO) and 1.2% carbon dioxide ($CO_2$) being produced by the cooking operation.

Configuration 1

A smoke abatement assembly according to FIG. 2 was employed which included a flame arrester, two catalysts (each 2 inches thick, 70 cpi) and one catalyst (1" thick, 50 cpi) positioned sequentially above the broiler cooking surface. The flame arrester was 7 inches above the broiler top, the bottom catalyst was 2 inches above the arrester and the other two catalysts had a gap of ½ inch between them. A short 3 inch hood section with a 12×12 inch opening was located on top of the assembly 10.

The temperature at the inlet 23 to the catalyst module 20 at idle, that is with the broiler ON but before the start of broiling, was about 700° F. Within one minute after cooking, the inlet temperature increased to 900°. Smoke stopped coming through the catalysts after about 30 seconds of meat broiling. The concentration of CO (carbon monoxide) in the exhaust was reduced to 0 ppm, while the carbon dioxide level increased to 2.7% which is indicative of the oxidation by-product.

Configuration 2

The operation of example 1 was repeated with the 1" thick/50 cpi top catalyst removed. Again the smoke passing through the remaining two catalysts stopped about 30 seconds after start of the meat broiling. The CO reading was again zero, showing the adequacy of the one arrester/two catalyst combination. The addition of a 9 inch long 12×12 inch hood section above the assembly resulted in an improved draft, which in turn minimized edge leaks due to the "chimney effect" on the flow of gas through the assembly.

Configuration 3

Using the same positioning as in Example 2, but replacing the two 70 cpi catalysts with two 50 cpi catalysts of the same thickness of 2 inches each, resulted again in no visible smoke after the warm-up period. Specifically, a full load of large hamburgers saw the smoke disappear in less than one minute. The CO concentration at exhaust or outlet opening 15 was zero, whereas the $CO_2$ concentration rose to 5% showing excellent oxidation efficiency.

Configuration 4

With the broiler system 35.5 inches above the floor level (i.e. the so-called restaurant position) two fine mesh coated screens were located, respectively, 6¼ and 7 inches above the broiler, a 2 inch thick 70 cpi catalyst was located 2 inches above the upper screen and a 2 inch thick 50 cpi catalyst was located ½ inch above the latter. A 4 inch long 14×14 inch hood was positioned above the catalyst assembly.

With a heavy load of hamburgers, grease flaming is so strong at times that a single flame arrester does not prevent direct flame contact with the lower-positioned catalyst. For this reason, a second coated screen was inserted directly adjacent the first arrestor 18 to protect the catalysts from exposure to the flame.

Catalyst temperatures at the bottom of the lower catalyst, with the broiler "ON" in the idle mode, were between 600° F. and 700° F. At steady state, full load broiling of large hamburgers produced temperatures between 1100° and 1200° F. at the bottom catalyst, with no visual smoke exiting through the catalyst module. The emissions contained 2.25% CO(2) and again essentially no carbon monoxide (0 ppm).

Configuration 5

The catalyst assembly consisted of an 8" high galvanized steel duct of cross section substantially equal to the cooking are of the broiler, i.e. about one sq. ft. Two coated arrester screens with a ½ inch gap were included, the lower being positioned 6½ inches above the broiler. Two 70 cpi catalysts, each 2 inches thick, were included with the lower one located 1 inch above the top arrester and the upper catalyst ½ inch above the lower catalyst.

In two series of tests a full load of small hamburgers and a full load of large hamburgers were broiled. The emissions from the small hamburgers contained 9.2% of $CO_2$ and raised the lower catalyst temperature to 1250°–1350° F. Cooking the large hamburgers yielded 7.4% $CO_2$ and an increased temperature of about 1150° F. There was no visible smoke emitted from the catalysts in either case. As with the prior configurations, the CO (carbon monoxide) content of the exhaust was essentially zero.

An important benefit was obtained through the use of the smoke abatement assembly of the present invention during these tests. The cooking broiler in the restaurant test site had two positions, "High Gas" and "Low Gas", indicating the natural gas consumption during broiling. Under normal broiling conditions, the High Gas position will automatically come on at a certain temperature in the cooking area to maintain the proper meat broiling temperature. When using the broiler in conjunction with the smoke abatement assembly 10, the Low Gas position was maintained by the broiler's automatic thermostat during a period of 15 minutes of continuous broiling. The High Gas position had not been activated once during that period, contrary to typical operating conditions of the broiler without the present invention in place. Thus, the presence of the catalysts on top of the broiler acted as a second source of heat providing the broiler with enough thermal energy, during a full load to run properly without switching frequently to the High Gas position. A beneficial effect of the use of this invention is lower natural gas consumption and, consequently lower fuel cost.

Yet another observation made by an expert in the field was that the quality of the meat coming off the broiler, when using the catalyst assembly, was as good if not better than the quality of meat obtained without the catalysts assembly. Apparently, the presence of the catalyst improved the uniformity of each hamburger of the entire batch on the moving belt. In the tests of each of the configurations, some smoke was exhausted during the initial idle and start-up of the cooking operation. The addition of a pre-heater, such as pre-heater 35, can eliminate even this small amount of smoke during the idle period.

Figure 4:
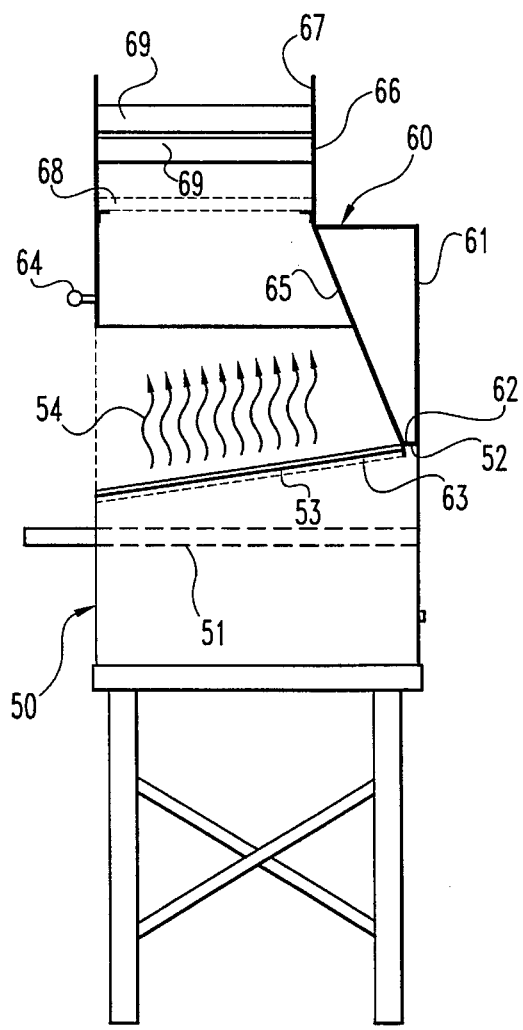
FIG. 4 is an end cutaway partial cross-section view of a smoke abatement assembly of another embodiment of the invention adapted to be mounted over a conventional fixed open-top cooking device, such as a grill.

Another embodiment of the invention is illustrated with respect to reference to FIG. 4. In this embodiment, a smoke abatement assembly 60 is provided for a stand-alone fixed cooking surface, such as a grill 50. The grill 50 can include a heating surface 51. The grill housing can include a rear flange 52 at opposite side flanges 53. Smoke 54 rising from the grill then passes through the smoke abatement assembly 50 which is removably mounted over the heating surface 51.

The smoke abatement assembly 60 includes a housing 61 which includes a rear lower mounting flange 62 for engaging the rear flange 52 of the grill, and a pair of side mounting flanges 63 which are adapted to engage inside the side flanges of the grill 50. A handle 64 is provided on the front of the smoke abatement assembly housing 61 to allow easy placement and removal of smoke abatement assembly 60. A sloped guide surface 65 is provided at the interior and back of the smoke abatement assembly to optimally channel smoke flow up through the duct means 66 of the smoke abatement assembly 60. The duct means 66 includes an outlet opening 67 which exhausts the treated smoke to the atmosphere. It is understood that the outlet opening 67 can be adapted to engage an outlet duct, such as duct 16 shown in FIG. 1.

The duct means 66 includes means for supporting a flame arrester 68 and a number of catalysts 69. It is also understood that the duct means 66 can be configured substantially similar to the duct means 11 shown in FIG. 2. However, under typical circumstances, a single unit open top grill 50 will not produce the same volume of cooking smoke 54 as a commercial fast-food restaurant conveyor-type grill. Thus, it is believed that only a pair of catalysts 69 are required to adequately process the smoke and gaseous pollutants coming off of the heating surface 51 of the grill 50. Nevertheless, the smoke abatement assembly 60 when applied to a single-unit grill 50, still implements the principles of the present invention by providing an optimal catalytic surface for treatment of the rising smoke.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A smoke abatement assembly for use with a cooking system having a housing and food heating elements contained within the housing, the heating elements defining a cooking area over which the food to be cooked is disposed, the smoke abatement assembly comprising:

a sealed housing defining an enclosure, said sealed housing having means for supporting said sealed housing on the cooking device such that said sealed housing substantially encloses the cooking area on at least two sides thereof;

a low-pressure flame arrestor;

first support means for supporting said flame arrestor within said sealed housing overlaying the cooking area;

a number of low-pressure oxidation catalysts; and second support means for supporting said number of catalysts within said sealed housing overlaying said flame arrestor, wherein, each of said flame arrestor and said number of catalysts defines a respective flow area, each said respective flow area being substantially equal to the cooking area of the cooking device, and wherein each of said flame arrestor and said number of catalysts is supported by said first and second support means, respectively, with said respective flow areas substantially overlaying the cooking area for access to smoke rising from food being cooked on the cooking device, and said number of catalysts adapted to substantially uniformly back radiate heat generated by the heating elements toward the whole of the cooking area.

2. The smoke abatement assembly of claim 1, wherein said flow area for each of said flame arrestor and said number of catalysts is between three-quarters (¾) and one and one-half (1½) times the cooking area.

3. The smoke abatement assembly of claim 1, wherein said flame arrester comprises a metallic substrate and each of said number of catalysts comprises a metallic honeycomb substrate.

4. The smoke abatement assembly of claim 3, wherein said flame arrester is a stainless steel screen coated with a catalyzed impurity-adsorbent.

5. The smoke abatement assembly of claim 1, wherein said first support means supports said flame arrester between one (1) and ten (10) inches above the cooking area of the cooking device when said sealed housing is supported on the cooking device.

6. The smoke abatement assembly of claim 1, wherein each of said number of catalysts is between one (1) and six (6) inches thick with between 25 and 300 cells per inch (cpi).

7. The smoke abatement assembly of claim 1, wherein said second support means supports a lowermost one of said number of catalysts between one-half (½) and two (2) inches above said flame arrester.

8. The smoke abatement assembly of claim 7, wherein said second support means supports additional ones of said number of catalysts above said lowermost catalyst with a gap between each such catalyst of between one-half (½) and two (2) inches.

9. The smoke abatement assembly of claim 1, wherein:

said assembly further comprises a module including said first and said second support means; and said housing includes;
  means for supporting said module within said housing; and
  a removable panel for access to remove said module from said housing.

10. The smoke abatement assembly of claim 1, further comprising a preheater assembly and means for mounting said preheater assembly to said sealed housing between said flame arrestor and the cooking area when said assembly is supported on the cooking device.

11. The smoke abatement assembly of claim 10, wherein said preheater assembly includes:

an opening in said sealed housing;

a blower having an outlet engaged to said opening in said sealed housing;

a burner disposed adjacent said outlet for heating air exhausted by said blower; and thermostatic control means for turning said burner on and off in relation to a temperature sensed at one or more of said number of catalysts to maintain said temperature within a predetermined range.

12. The smoke abatement assembly of claim 1 in which the cooking device includes a conveyor for continuously conveying food from an inlet to an outlet over the heating elements, wherein said housing includes a canopy extending beneath said enclosure and configured to cover the inlet and outlet of the cooking device.

13. The smoke abatement assembly of claim 12, wherein said canopy defines a flow area sufficient to draw air by convection into said housing at a rate of between 30 and 80 cubic feet per minute when food is being cooked by the cooking device.

* * * * *